US011875769B2

(12) United States Patent
Chan et al.

(10) Patent No.: US 11,875,769 B2
(45) Date of Patent: Jan. 16, 2024

(54) BABY MONITOR SYSTEM WITH NOISE FILTERING AND METHOD THEREOF

(71) Applicant: Kelvin Ka Fai Chan, Kowloon (HK)

(72) Inventors: Kelvin Ka Fai Chan, Kowloon (HK); Hon Hung Leung, New Territories (HK); Hon Kuen Chan, New Territories (HK); Zhi Qiang Gan, Kowloon (HK); Tse Yim Lau, Kowloon (HK)

( * ) Notice: Subject to any disclaimer, the term of this patent is extended or adjusted under 35 U.S.C. 154(b) by 0 days.

(21) Appl. No.: 17/490,366

(22) Filed: Sep. 30, 2021

(65) Prior Publication Data

US 2022/0020352 A1 Jan. 20, 2022

Related U.S. Application Data

(63) Continuation-in-part of application No. 16/910,096, filed on Jun. 24, 2020, now Pat. No. 11,240,590.

(60) Provisional application No. 62/880,764, filed on Jul. 31, 2019.

(51) Int. Cl.
*G10K 11/178* (2006.01)
*H04R 3/04* (2006.01)

(52) U.S. Cl.
CPC .. *G10K 11/17827* (2018.01); *G10K 11/17823* (2018.01); *H04R 3/04* (2013.01); *G10K 2210/108* (2013.01)

(58) Field of Classification Search
CPC ....... G10K 11/17827; G10K 11/17823; G10K 2210/108; H04R 3/04; G10L 21/0208; G10L 2021/02165
See application file for complete search history.

(56) References Cited

U.S. PATENT DOCUMENTS

| | | | | |
|---|---|---|---|---|
| 6,473,733 | B1 * | 10/2002 | McArthur | G10L 21/0208 704/226 |
| 9,191,744 | B2 | 11/2015 | Anderson | |
| 9,542,924 | B2 | 1/2017 | Kuo | |
| 2006/0273914 | A1 * | 12/2006 | Carreras | G10L 21/0208 340/539.15 |
| 2009/0235006 | A1 * | 9/2009 | Desrosiers | H04B 1/3877 710/304 |
| 2012/0299732 | A1 | 11/2012 | Vogel | |
| 2015/0172816 | A1 | 6/2015 | Ivanov | |
| 2015/0208165 | A1 | 7/2015 | Volk | |

(Continued)

*Primary Examiner* — Jason R Kurr
(74) *Attorney, Agent, or Firm* — JMB Davis Ben-David

(57) ABSTRACT

A baby monitor system with white noise filtering comprises a camera unit and a monitor unit, wherein the camera unit is predefined soothing sounds and play at least one of the predefined soothing sounds for baby; the camera unit records the mixture sound of baby, ambient noises and white noises and transforms the mixture sound to sound features, wherein the white noises at least include the soothing sounds and stationary noise; the recorded sound features are compared to local audio features of the predefined soothing sounds; if there are matching features between the recorded sound features and the local audio features, removing the matching features from the recorded sound features; the stationary noise features are extracted and removed from the recorded sound features; the camera unit outputs the recorded mixture sound without the white noise to the monitor unit.

4 Claims, 10 Drawing Sheets

(56) References Cited

U.S. PATENT DOCUMENTS

| | | | | |
|---|---|---|---|---|
| 2015/0288877 | A1* | 10/2015 | Glazer | A61B 5/6891 348/77 |
| 2016/0066087 | A1* | 3/2016 | Solbach | G10L 21/0232 381/71.1 |
| 2016/0174728 | A1 | 6/2016 | Karp | |
| 2020/0364583 | A1 | 11/2020 | Pedersen | |

* cited by examiner

BABY MONITOR SYSTEM WITH NOISE FILTERING AND METHOD THEREOF

CROSS REFERENCE TO RELATED APPLICATIONS

The patent application is a continuation-in-part of U.S. patent application Ser. No. 16/910,096 filed on Jun. 24, 2020, which claims priority of Provisional Application No. 62/880,764, filed on Jul. 31, 2019. The contents of the foregoing applications are incorporated by reference herein in their entirety.

FIELD OF THE INVENTION

The present invention generally relates to the technical field of baby monitor, and particularly to a baby monitor system with noise filtering.

BACKGROUND OF THE INVENTION

Nowadays, baby monitor is a very popular electronic consumer product because it can help guardian to monitor the status of their baby in a distant manner. In general, there are a camera unit which is placed nearby the target object (baby) for capturing the image/voice and a monitor unit for monitoring purpose by guardian or guardians. The camera unit and the monitor unit are connected wirelessly and needed to be paired before normal operation. After the pairing process, the camera unit detects voice and movement made by the baby and transmits encrypted video and audio data to the monitor unit for monitoring by the guardian or guardians.

With the development of technology, some high-end models of the baby monitor can generate lullaby such that it can help baby to calm down and then prepare for sleep. However, it affects to hear the baby's sounds and movements and it is also easy to make the guardian to sleep if they hear the lullaby when monitoring the baby, which is not what the guardian wants. A successful product design of baby monitor should create satisfactions to both guardian and baby. Thus, there is a need to improve the existing baby monitor.

SUMMARY OF THE INVENTION

The present invention is to provide a baby monitor system with noise filtering to keep hearing a clean voice quality for guardian.

The baby monitor system with noise filtering comprises a camera unit and a monitor unit, the camera unit comprises a voice detection module, the monitor unit comprises a Digital Signal Processing (DSP) processor with Environmental Noise Cancellation (ENC) module and filters; the voice detection module detects target signals from baby and ambient noise signals to form audio streaming data, and transmits the audio streaming data to the monitor unit in encrypted format; the monitor unit converts the audio streaming data to analog signals and passes the analog signals to input of ENC module of the DSP processor; the ENC module identifies the noise signals and target signals from the analog signals, and activates the filters to filter the noise signals according to frequency bands of noise for attenuating noise sound and to pass the target signals with signal amplification for improving target sound; wherein the ambient noise signals include more than one noise and different noises are according to different frequency bands, and the filters are used to filter the noises in identified frequency bands.

The present invention uses DSP algorithms or DSP processor with ENC module into the baby monitor system to filter the noise signals, so as to attenuate noise signals and pass the target signals with signal amplification, thus the sound from baby can be detected and listened by the user more clearly with high quality audio performance.

The baby monitor system with noise filtering of the present invention comprises: a camera unit and a monitor unit, wherein the camera unit is predefined soothing sounds and play at least one of the predefined soothing sounds for baby; the camera unit records the mixture sound of baby, ambient noises and white noises and transforms the mixture sound to sound features, wherein the white noises at least include the soothing sounds and stationary noise; the recorded sound features are compared to local audio features of the predefined soothing sounds; if there are matching features between the recorded sound features and the local audio features, removing the matching features from the recorded sound features; the stationary noise features are extracted and removed from the recorded sound features; the camera unit outputs the recorded mixture sound without noise to the monitor unit.

In the present invention the camera unit of the baby monitor can generate the soothing sounds such that baby can have a feeling in nature and safe environment rather than lying down alone in a baby room, so that the emotions of baby can easily calm down and eventually fall asleep. The soothing sounds are also filtered by camera unit before sending to the monitor unit, so that the guardian can keep hearing a crystal clean voice quality at the monitor unit. This is a new value-added function for baby and guardian we cannot be found from any brand of baby monitor at present.

BRIEF DESCRIPTION OF THE DRAWINGS

Embodiments of the present invention are described below by way of example with reference to the accompanying drawings in which.

DETAILED DESCRIPTION OF THE INVENTION

The technical solutions in the embodiments of the present invention are clearly and completely described in the following with reference to the accompanying drawings in the embodiments of the present invention. It is obvious that the described embodiments are only parts of the embodiments of the present invention, and not all the embodiments. Based on the embodiments of the present invention, all other embodiments obtained by a person of ordinary skill in the art without creative work should fall within the protection scope of the present invention.

In the present invention, the baby monitor system includes a camera unit which is placed nearby the baby for capturing the image/sound and a monitor unit for monitoring purpose by the user.

The first embodiment of the present invention.

In the embodiment, the camera unit has a detection module and the monitor unit has a passive resistor-capacitor (RC) filter. The detection module detects target signals from baby as well as ambient noise signals. The RC filter is integrated into the circuitry design of the baby monitor system, wherein the RC filter includes an active high pass filter circuitry. The advantage of the RC filter is that the material cost of the RC filter is relatively low. For those skilled people in the art, the noise from environment mainly consists of low frequency audio signals. The RC filter can filter the noise signals according to the low frequencies from surrounding environment, e.g. the low frequency is below 1 KHz. This helps to attenuate low frequency noise signals (e.g., fans, white noise machines, traffic, air conditioners, etc.) and to pass high frequency target signals (e.g., baby crying etc.) with signals amplification. So the sound from baby can be detected and listened by the user more clearly with high quality audio signals.

Figure 1:
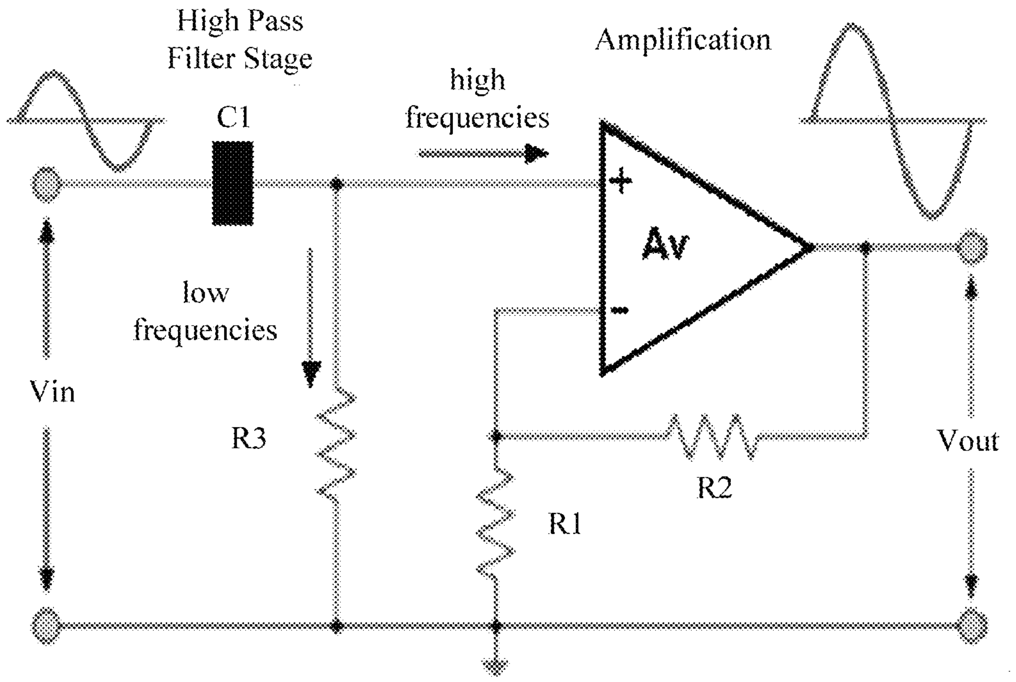
FIG. 1 is a circuit diagram of first-order active high pass filter in the first embodiment of the present invention.

Referring to FIG. 1, in one embodiment, the RC filter adopts first-order (single-pole) active high pass filter. The first-order active high pass filter includes a passive filter followed by a non-inverting amplifier. The frequency response of the circuit is the same as that of the passive filter, except that the amplitude of the signals is increased by the gain of the amplifier. For example, the frequency response curve of the first-order active high pass filter increases by 20 dB/decade up to the determined cut-off frequency point which is always at −3 dB below the maximum gain value.

Figure 2:
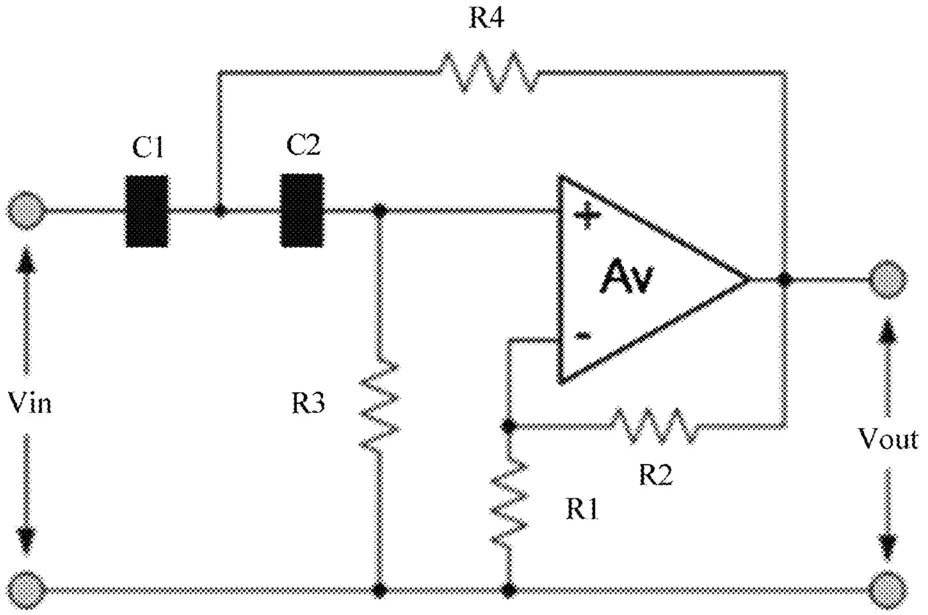
FIG. 2 is a circuit diagram of second-order active high pass filter in the first embodiment of the present invention.

Referring to FIG. 2, in one embodiment, the RC filter adopts second-order active high pass filter. As with the passive filter, a first-order active high pass filter can be converted into a second-order active high pass filter by using an additional RC circuit in the input path. The frequency response of the second-order active high pass filter is identical to that of the first-order active high pass filter except that the stop band roll-off is twice the first-order active high pass filter at 40 dB/decade.

In other embodiment, the RC filter adopts higher-order active high pass filters, such as third, fourth, fifth, etc. The higher-order active high pass filters are formed by cascading together first-order and/or second-order filters. For example, the third order active high pass filter is formed by cascading in series a first-order and a second-order filters, a fourth-order active high pass filter is formed by cascading two second-order filters together and so on.

For the active high pass filter, the related equations for the major parameters are described as below.

The voltage gain for the active high pass filter can be referred to below formula:

$$VoltageGain, (Av) = \frac{Vout}{Vin} = \frac{A_F\left(\frac{f}{f_c}\right)}{\sqrt{1+\left(\frac{f}{f_c}\right)^2}}$$

Where:

$V_{out}$=the output voltage of the circuit;

$V_{in}$=the input voltage of the circuit;

$A_F$=the pass band gain of the filter;

f=the frequency of the input signals in Hertz, (Hz);

fc=the cut-off frequency in Hertz, (Hz).

The operation of the active high pass filter can be verified from the frequency gain equation above as:

At very low frequencies, f<fc $$\frac{Vout}{Vin} = \frac{A_F}{\sqrt{2}} = 0.707A_F$$

At the cut-off frequency, f=fc $$\frac{Vout}{Vin} \cong A_F$$

At very high frequencies, f>fc $$\frac{Vout}{Vin} < A_F$$

The active high pass filter has a gain $A_F$ that increases from 0 Hz to the low frequency cut-on point, f c at 20 dB/decade (for 1st Order Active High Pass Filter) as the frequency increases. At fc the gain is 0.707*AF, and after fc all frequencies are pass band frequencies so the filter has a constant gain $A_F$ with the highest frequency being determined by the closed loop bandwidth of the amplifier.

When dealing with filter circuits, the magnitude of the pass band gain of the circuit is expressed in decibels or dB as a function of the voltage gain, and this is defined as:

$$Av(\mathrm{dB}) = 20\log_{10}\left(\frac{Vout}{Vin}\right)$$

The Pass band Gain of the filter (AF) can be found by using below formula:

$$A_F = 1 + \frac{R_2}{R_1}$$

Where:

R2 is the feedback resistor;

R1 is the corresponding input resistor.

The cut-off frequency or corner frequency (fc) can be found by using below formula:

For first-order active high pass filter $$f_c = \frac{1}{2\pi RC}Hx$$

For second-order active high pass filter and so on.

$$f_c = 2\pi\frac{1}{\sqrt{R_3R_4C_1C_2}}$$

The second embodiment of the present invention.

In one way of the embodiment, the present invention disclosed herein relate generally to the baby monitor system with noise filtering by using Digital Signals Processing (DSP) algorithms, wherein the digital high pass filter and the digital low pass filter can be implemented. A desired band pass filter is formed by cascading at least one high pass filter and at least one low pass filter. The band pass filter's characteristic can be easily designed and changed by software programming to approach the flexibility for the filter.

In another way of the embodiment, the implementation by using Digital Signals Processing (DSP) processor is also a possible solution. The present invention includes the DSP processor with using Environmental Noise Cancellation (ENC) technology for implementation of noise cancellation/reduction feature. The DSP processor is a microprocessor chip with its architecture optimized for the operational needs of digital signals processing and is usually to measure, filter or compress continuous real-world analog signals via the execution of its digital signals processing algorithms. In the present invention, the filtering function of the DSP processor is used to achieve the noise cancellation/reduction purpose. With applying the DSP processor on the baby monitor system of the present invention, the ambient noise received in baby's room can be reduced, so that the sound from the baby can be detected and listened by the user more clearly.

Figure 3:
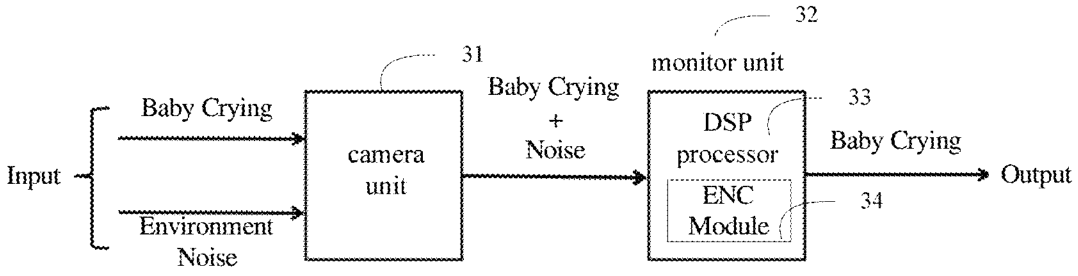
FIG. 3 is a block diagram of the baby monitor system including DSP (Digital Signal Processing) with ENC (Environmental Noise Cancellation) module embedded in the monitor unit in the second embodiment of the present invention.
Figure 4:
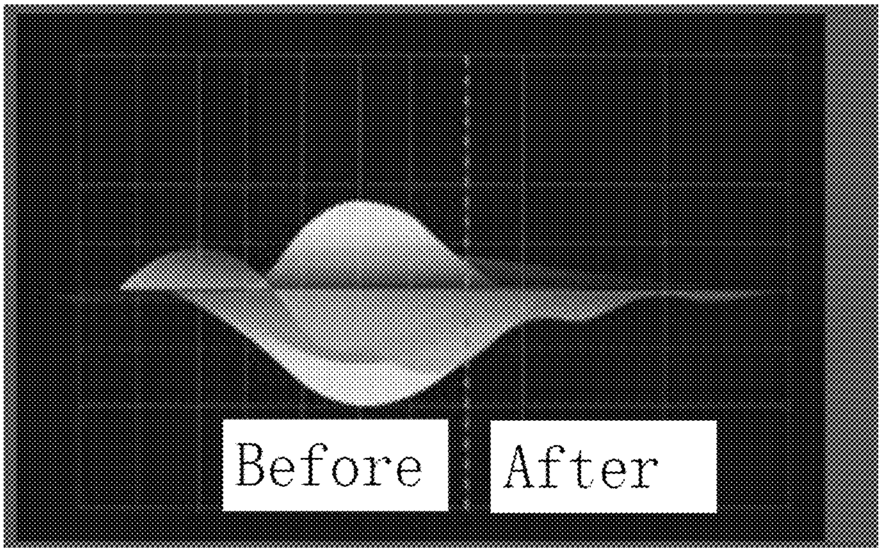
FIG. 4 is a spectrum diagram before and after noise cancellation/reduction of the baby monitor system in the second embodiment of the present invention.

Referring to FIG. 3 which is the block diagram of the baby monitor system including a camera unit 31 and a monitor unit 32 having a DSP processor 33 with ENC module 34. The camera unit includes a voice detection module. The voice detection module of the camera unit detects the target signals (e.g., baby crying) as well as the ambient noise signals (e.g., fans, air purifiers, air conditioners, etc.). The audio streaming data including the mixture of the target signals and noise signals is transmitted from the camera unit to the monitor unit in encrypted format. The monitor unit converts the audio streaming data to analog signals and then passes to the input of ENC module, the ENC module identifies the frequency bands of noise. The ambient noise signals include more than one noise and different noises are according to different frequency bands. The filters are used to filter the noises in identified frequency bands. Once frequency bands of noise are detected, the ENC module activates related filter to filter the detected frequency bands for noise. The frequency bands of the target sound outside the detected frequency bands of noise can be passed. Eventually, the target signals (pure baby crying sound without noise) can be heard from the speaker's output of the monitor unit. Therefore, the noise signals are filtered and the amplitude of noise level can be reduced. Referring to FIG. 4 which is the spectrum diagram before and after noise cancellation/reduction of the baby monitor system of the present invention.

The ENC module of the DSP processor of the present invention can support multi audio effect functions. The audio effect functions include Surround Headphone, Sound Expender, Parametric EQ, Dynamic Bass, Brilliant Audio and Smart Volume etc. In the embodiment, the Surround Headphone and Sound Expander cannot be active at the same time, while other audio effect functions can work independently. However, in other embodiment, all audio effect functions can work independently or with other settlement. It is not limited in the present invention.

Figure 5:
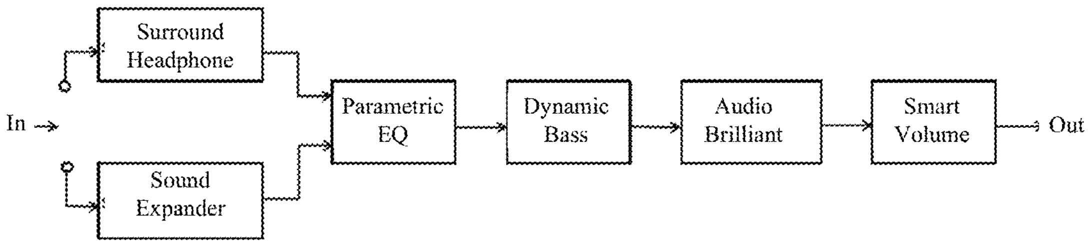
FIG. 5 is a block diagram of the audio effect functions in the second embodiment of the present invention.

Referring to FIG. 5 which is the block diagram of the audio effect functions.

Where:

Surround Headphone: Generate surround effect with headphone;

Sound Expander: Generate surround effect with two speakers;

Parametric EQ: Adjusting the frequency response with a 5 bands equalizer;

Dynamic Bass: Simulating bass effect with speakers (Many speakers lack of very low frequency response due to the cut off frequency limitation);

Brilliant Audio: Enhancing the high frequency components to make the audio brighter;

Smart Volume: Providing a comfortable listening experience by controlling the dynamic range of audio signals.

In the baby monitor system of the present invention, the audio effect function of Parametric EQ is applied to realize the noise cancellation/reduction. The DSP processor includes the Parametric EQ for adjusting the frequency response with equalizer to filter the frequency bands of noise while keep or amplify the frequency bands of target sound. The parametric EQ controls the audio signal's frequency content, which is divided into several bands of frequencies. The parametric EQ can be a combination of broad and narrow bandwidths to achieve the desired effect which is to remove the noise band while keep or amplify the signal band of content in the present invention.

The current ENC module receives two microphone audio input signals, and the two microphone audio input signals need to meet the requirements of omni-direction, low noise level and low manufacturing tolerance. These two microphone audio input signals can be defined as main and auxiliary by location and pin definition to ENC module. Normally, the main microphone audio input signal is from the location nearby the target object while the auxiliary microphone audio input signal is from the location relative far away from the target object. The main microphone audio input signal is picked up with ambient noise while the auxiliary microphone audio input signal is picked up only with ambient noise. The electrical characteristic of the two microphone audio input signals have to match, i.e. the electrical and passive components in both paths must be nearly the same. The DC-blocking capacitors, decoupling capacitors, and microphone bias of both microphone paths are same. When the conditions are met, the noise cancellation is fully effective. As an example, the following are the electrical characteristics of microphones in the camera unit of the baby monitor system:

| No. | Item | Specification |
|---|---|---|
| 1 | Directivity | Omni-directional |
| 2 | S/N ratio | Min 58 dB (f = 1 kHz) |
| 3 | Sensitivity | −44.5 + −2dB (f = 1 kHz) |
| 4 | Distortion | Max 3% (f = 1 kHz, Pin = 104 dB) |

However, the current baby monitor system only has single microphone for picking up sound. In the present invention, to fulfill the requirement of main and auxiliary microphone audio input signals to the ENC module, the output of the single microphone needs to be feed into the two audio input ports of the ENC module. The silence detector in ENC module classifies each frame of audio signal as either pure environmental noise or environmental noise mixed with baby's sound from the auxiliary audio input path. Based on the classification result, the respective spectral subtraction process or attenuation process is performed in main audio input path. In the spectral subtraction process, the noise spectrum is estimated during speech pauses, and is subtracted from the noisy speech spectrum to estimate the clean speech. Specifically, the decoded baseband audio data is OUTR which is input to two microphone input ports of ENC module from the microcontroller (MCU) of monitor unit. The control signals are sent from the MCU to the ENC module. Voltage level of the control pin to ENC module (ENC-SW) is changed according to the control signals. When the voltage level of the control pin to ENC module is set to ground, the ENC module is activated and it is deactivated when the voltage level is set to HIGH. In active state, the ENC module identifies the frequency bands of noise by using auto-correlation function between two microphone input signals and activates related filter to filter the detected frequency bands for noise.

Figure 6:
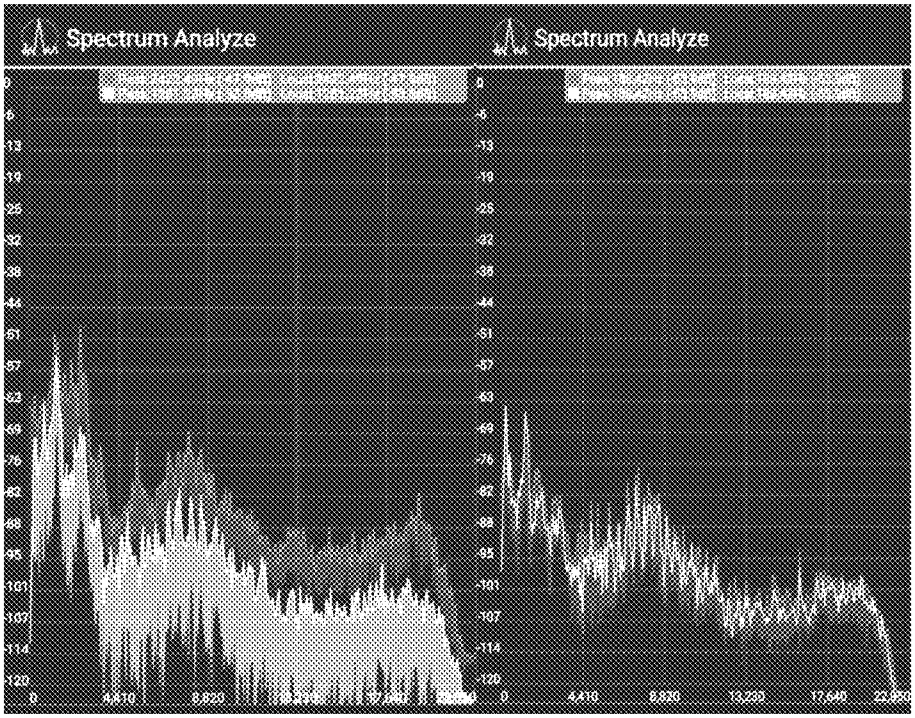
FIG. 6 is a schematic view of showing the effect to the output sound signal in the second embodiment of the present invention.

Mixing the original input signals with noise signals are to show the effect to the output sound signals. Referring to FIG. 6, left-hand side is the audio spectrum of the mixed input signals while right-hand side is the output signals after noise filtering by the DSP processor. The amplitude of noise signals in its frequency band (<4.4 KHz) has been diminished significantly by respective Parametric EQ band pass filter while the high frequency band (>4.4 KHz) has been kept similar to original input signals. From this FIG. 6, the peak amplitude of noise has been reduced from −47 dB to −63 dB significantly to achieve the noise cancellation/reduction effect.

Figure 7:
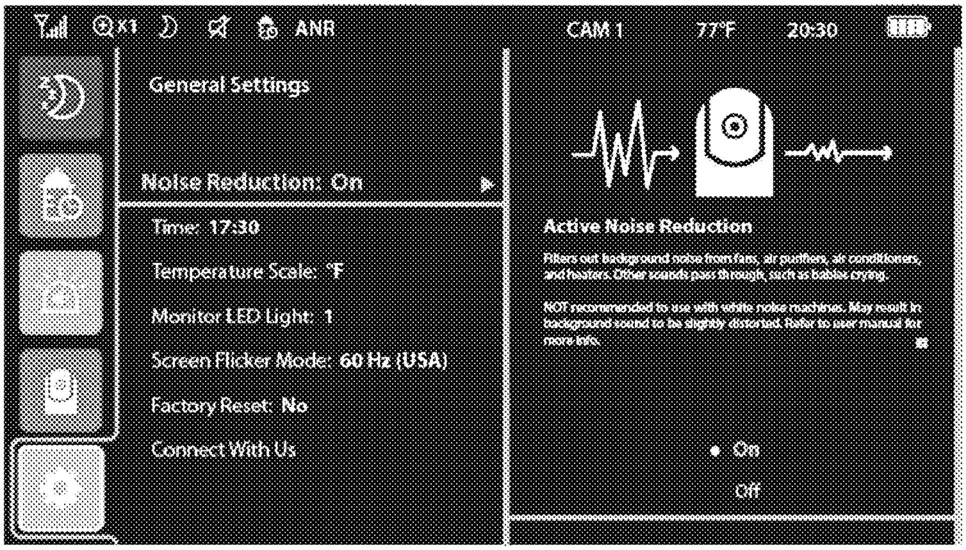
FIG. 7 is a spectrum diagram view of User Interface Menu option at the monitor unit in the second embodiment of the present invention.

Referring to FIG. 7, the present invention also provides the compatible User Interface Menu option at the monitor unit for the user to choose the option of turning on or off the noise reduction function. In the baby monitor system of the present invention, the user can use the User Interface Menu option, so that the internal microcontroller sends the control signals to ENC-SW pin of ENC module to activate the noise reduction function. Therefore, the sound from baby can be detected and listened by the user more clearly with high quality audio signals after activating the noise cancellation/reduction function and the new function is useful and attractive to the user of the baby monitor.

In the current market of the baby monitor products, the baby sound may not be heard clearly because of overlapping with ambient stationary noise generated by air conditioner or fan etc. Therefore, it is definite a value-added feature to the end user if the baby monitor product can have ANR (Active Noise Reduction) to filter the ambient stationary noise for parents while monitoring their babies. The embodiment of the present invention is the application of spectral subtraction technique to baby monitor system such that the stationary noise which picked up from CAM unit can be removed and then only baby sound can be playback to the parents.

Figure 8:
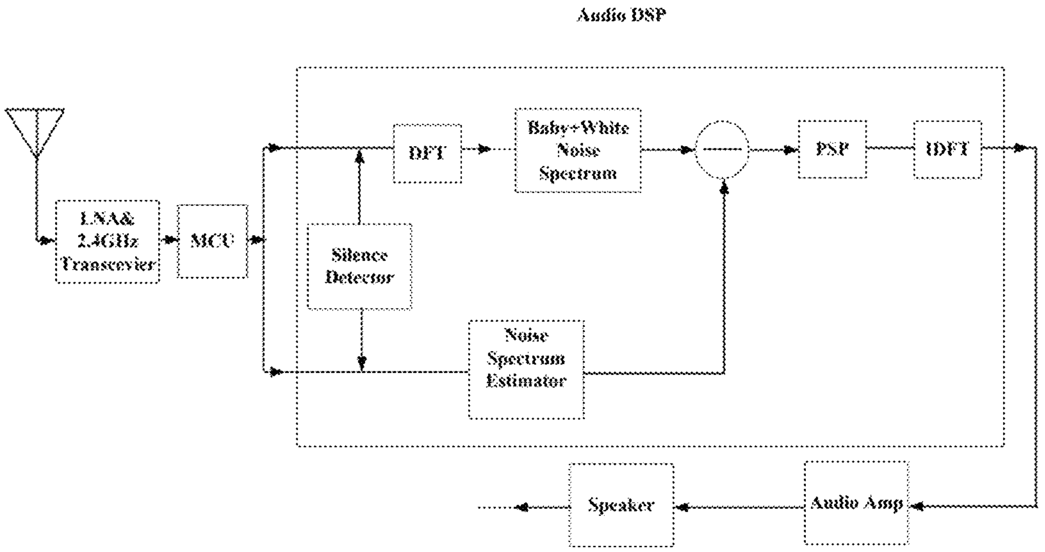
FIG. 8 is a block diagram of the structure of the baby monitor system with audio DSP in the second embodiment of the present invention.

To tackle the noise problem in baby monitor product, an audio DSP has been added in the hardware of monitor unit. To achieve the removal of stationary noise, a spectral subtraction algorithm is applied and implemented by the audio DSP. To secure the acoustic quality to parents, one audio DSP is placed in monitor unit rather than CAM unit. FIG. 8 shows the special structure (built-in audio DSP) and methods (silent detection, noise spectrum estimation and spectral subtraction) that are combined with the monitor unit.

Figure 9:
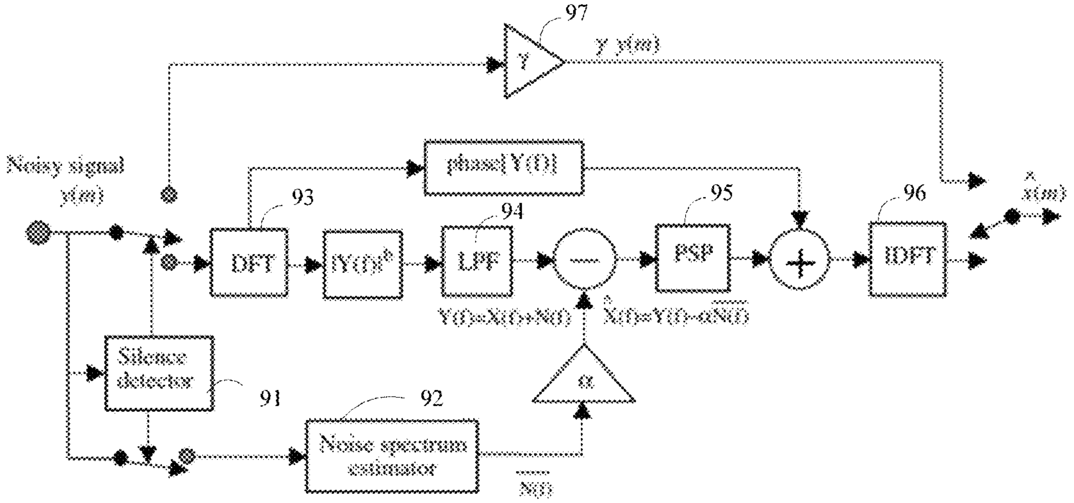
FIG. 9 is a block diagram of the detailed structure of the audio DSP in the second embodiment of the present invention.

FIG. 9 provides a more detailed system of the audio DSP. There are two main parts. The first one is a silence detector and the other part is the PSP module/ANR module. In detail, the silence detector 91 is for detection of the periods of signal inactivity which classify each time frame of data (for example 50 ms in the system) as silence or solely ambient noise or baby's sound overlapping with ambient noise by checking the energy level of each time frame; the noise spectra 92 is for updating during the periods; a Discrete Fourier transformer (DFT) 93 is followed by a magnitude operator for transforming the time domain signal to the frequency domain; a lowpass filter (LPF) 94 is for reducing the noise variance and the purpose of the LPF is to reduce the processing distortions due to noise variations; a post-processor (PSP) 95 is for removing the processing distortions introduced by spectral subtraction; an Inverse Discrete Fourier transform (IDFT) 96 is for transforming the processed signal to the time domain; an attenuator y 97 is for attenuation of the noise during silent periods.

The DFT-based spectral subtraction is a block processing algorithm. The incoming audio signal is buffered and divided into overlapping blocks of N samples as shown in FIG. 9. Each block is Hamming windowed, and then transformed via a DFT to the frequency domain. After spectral subtraction, the magnitude spectrum is combined with the phase of the noisy signal and transformed back to the time domain. Each signal block is then overlapped and added to the preceding and succeeding blocks to form the final output.

The choice of the block length for spectral analysis is a compromise between the conflicting requirements of the time resolution and the spectral resolution. In the system, it uses 20~50 ms block length for analysis. At a sampling rate of say 20 kHz, this translates to a value for N in the range of 400~1000 samples. The frequency resolution of the spectrum is directly proportional to the number of samples, N. A larger value of N produces a better estimate of the spectrum. This is particularly true for the lower part of the frequency spectrum, since low-frequency components vary slowly with the time and require a larger window for a stable estimate.

Figure 10:
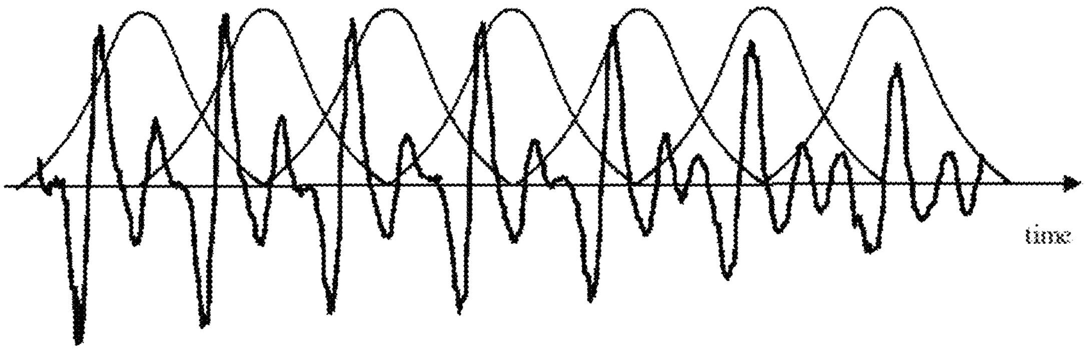
FIG. 10 illustrates the window and the overlap operations to alleviate discontinuities at the endpoints of each output block in the second embodiment of the present invention.

The main function of the window and the overlap operations as shown in FIG. 10 is to alleviate discontinuities at the endpoints of each output block. Although there are many useful windows with different frequency/time characteristics, in the system it uses the most popular Hamming window. In removing distortions introduced by spectral subtraction, the post-processor algorithm makes use of such information as the correlation of each frequency channel from one block to the next, and the durations of the signal events and the distortions.

Figure 11:
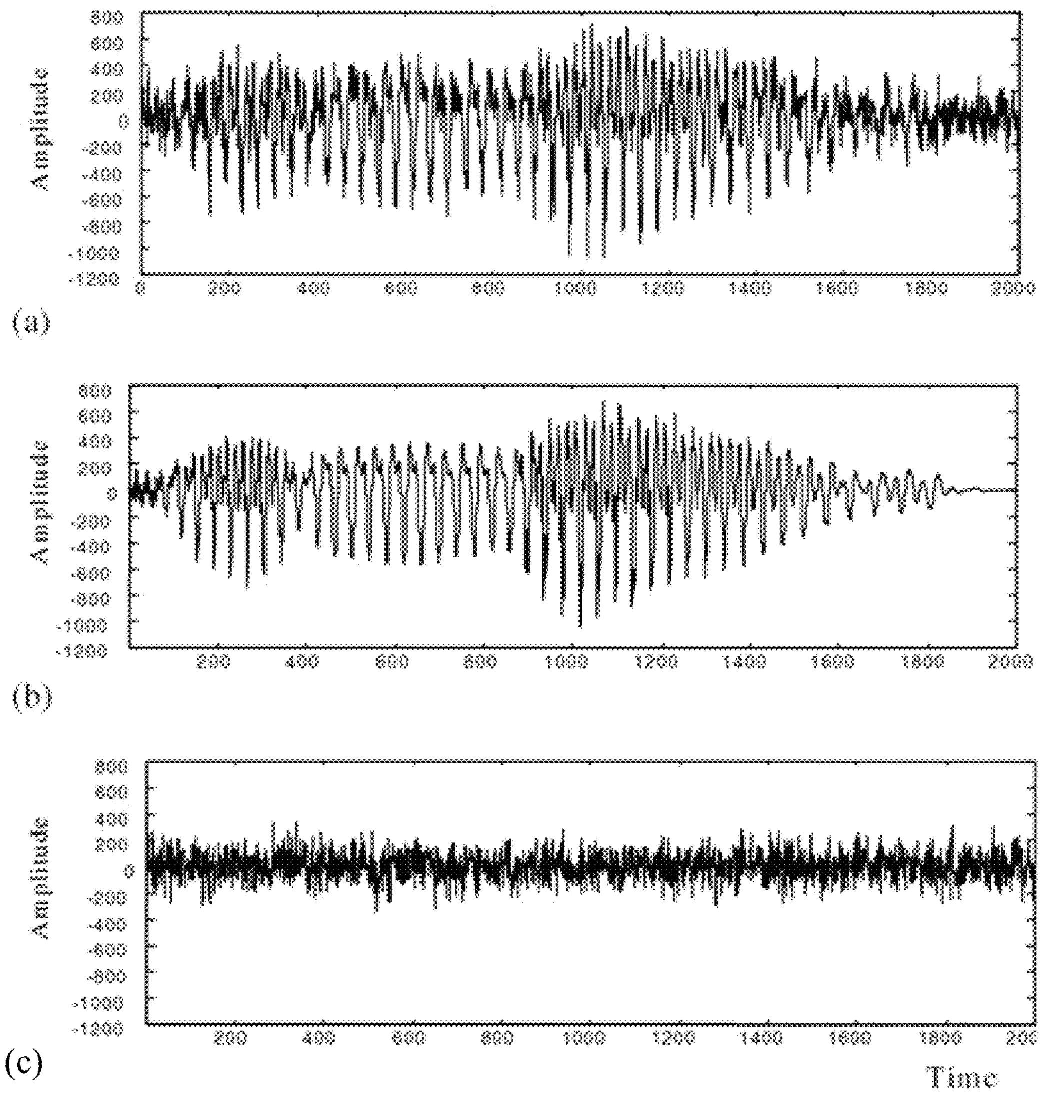
FIG. 11 illustrates the effects of spectral subtraction in restoring a section of a speech signal contaminated with noise in the second embodiment of the present invention.

FIG. 11 illustrates the effects of spectral subtraction in restoring a section of a speech signal contaminated with noise, wherein (a) is a noisy signal; (b) is a restored signal after spectral subtraction; and (c) is a noise estimated obtained by subtracting (b) from (a).

The third embodiment of the present invention.

Comparing to the former embodiments, the camera unit of the baby monitor has an addition function, i.e. the camera unit can generate soothing sounds such that the emotions of baby can easily calm down and eventually fall asleep. On the other hand, the soothing sounds are filtered before sending to the monitor unit of the baby monitor. Without the soothing sounds, the guardian can keep hearing a clean voice quality from the monitor unit.

Figure 12:
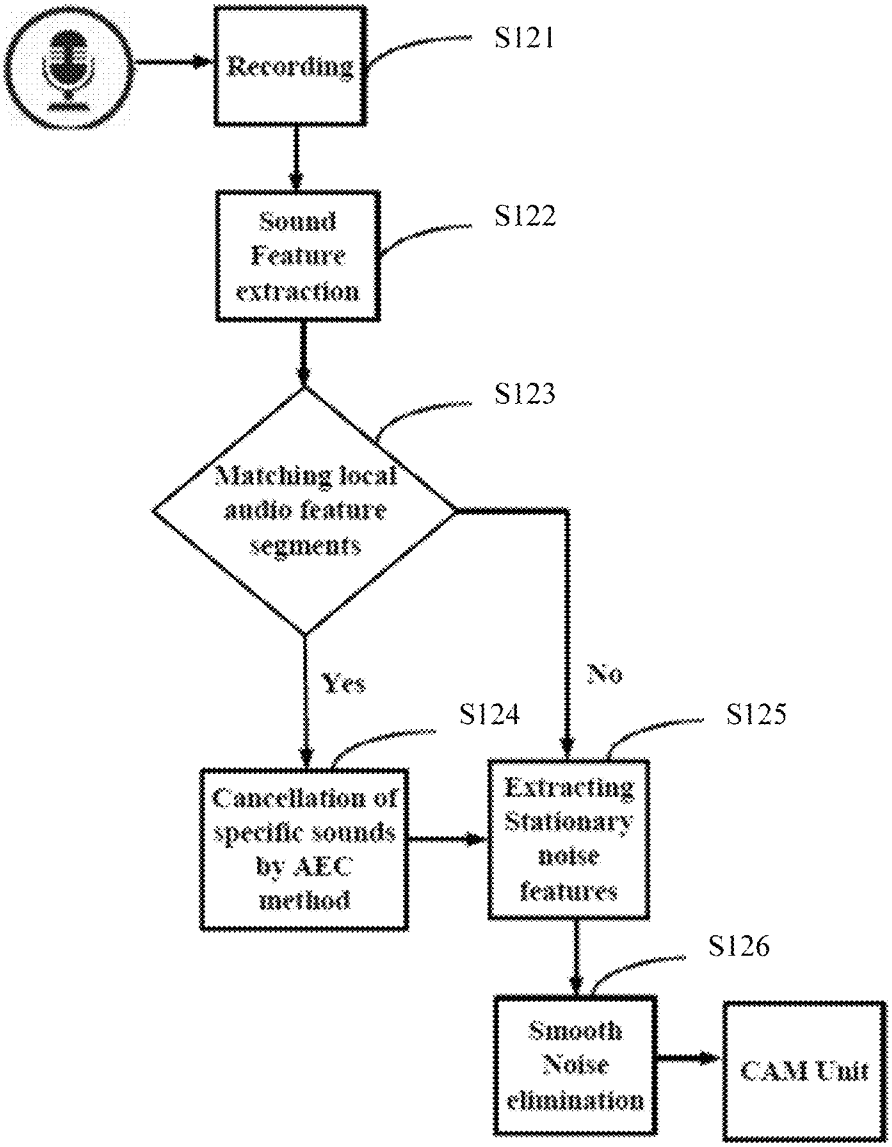
FIG. 12 is a block diagram of the method for filtering the noise in the third embodiment of the present invention.

Referring to FIG. 12, the method for filtering the noise are as below:

S121, the camera unit is to play at least one of the predefined soothing sounds for baby, while the camera unit is to record the mixture sounds of baby sound (baby crying, baby movements etc.), ambient noises and white noises, wherein the white noises at least include the soothing sounds and stationary noise;

S122, the mixture sound stream of baby sound, ambient noises and white noises are transformed to sound features;

S123, the recorded sound features are compared to the local audio features of the predefined soothing sounds; if there are matching features between the recorded sound features and the local audio features, go to S124; otherwise, go to S125;

S124, removing the matching features from the recorded sound features by AEC method and go to S125;

In the S124, the AEC method is to generate an adaptive filter based output signals. The AEC adaptive filter software implements a least-mean-squared (LMS) algorithm and an adaptive finite impulse response (FIR) filter. The algorithm uses the previous sample values and errors to update the FIR filter's coefficients. It then uses the updated new coefficients and the latest sample values to calculate the FIR filter's output. This output is used to calculate the next error.

Figure 13:
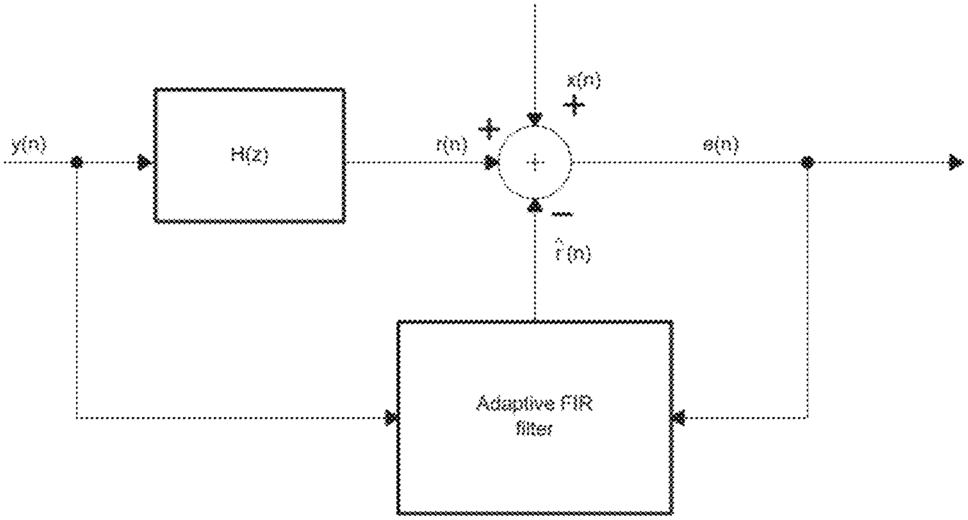
FIG. 13 illustrates the output signal after AEC (Acoustic Echo Cancellation) in the third embodiment of the present invention.

Referring to FIG. 13, the output signal after AEC e(n) is:

$$e(n)=x(n)+r(n)-\hat{r}(n)$$

wherein:

y(n)=white noise,

H(z)=transform function for echo path from speaker to microphone;

x(n)=baby crying;

r(n)=recorded white noise from microphone;

$\hat{r}$(n)=estimated white noise by adaptive FIR filter.

If there is no baby crying, that is, x(n)=0, then the equation for the error signal e(n) is: $e(n)=r(n)-\hat{r}(n)$.

S124, extracting the stationary noise features of the recorded sound features and removing the stationary noise features;

In the S125, converting the time-domain signal recorded in unit time into frequency-domain signal, performing noise frequency estimation until convergence, and performing appropriate spectral subtraction on the uploaded signal to remove stationary noise. The average magnitude of white noise spectrum is estimated from the frames of baby crying absence, usually from initial frames of the signal in case of stationary noise conditions. Once the white noise spectrum is obtained, it can be used for operation of spectral subtraction for each frame of voice, i.e. the average magnitude of white noise spectrum is subtracted from the noisy baby crying spectrum.

Figure 14:
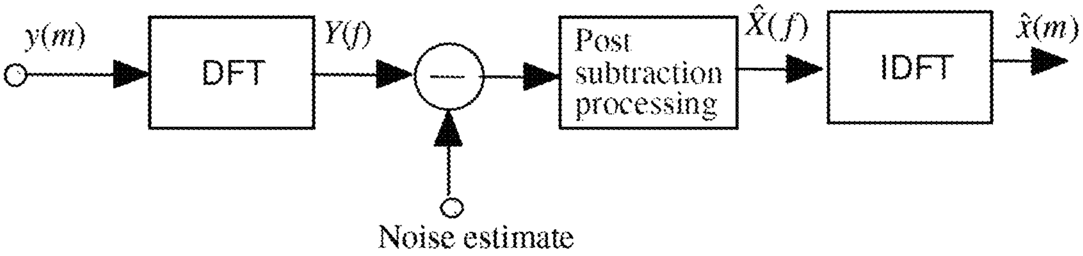
FIG. 14 is block diagram illustration of spectral subtraction in the third embodiment of the present invention.

Referring to FIG. 14 which is a block diagram illustration of spectral subtraction.

Wherein, y(m)=voice input (baby crying+white noise);

Y(f)=spectrum of voice input (baby crying+white noise);

$\hat{X}$(f)=spectrum after subtraction of estimated white noise spectrum;

$\hat{X}$(m)=estimated voice output (without white noise).

S126, outputting the recorded sound stream without the white noise.

Figure 15:
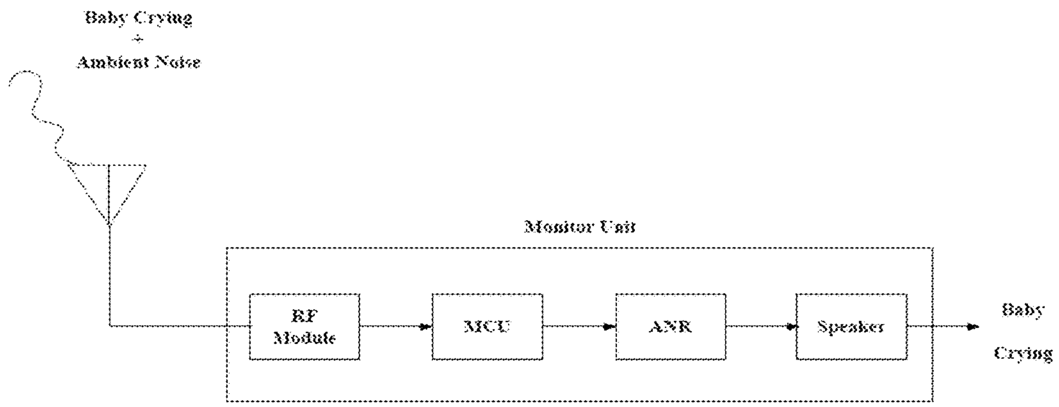
FIG. 15 is a block diagram of the structure of the camera unit for filtering the ambient noises in the third embodiment of the present invention.

Referring to FIG. 15, after removing the white noise, the recorded sound stream includes baby sound and ambient noises. The ambient noises are finally filtered by the ANR circuit in the monitor unit as described in the first and second embodiment of the present invention. So, the guardian only hears clean baby crying without any kind of noises.

Figure 16:
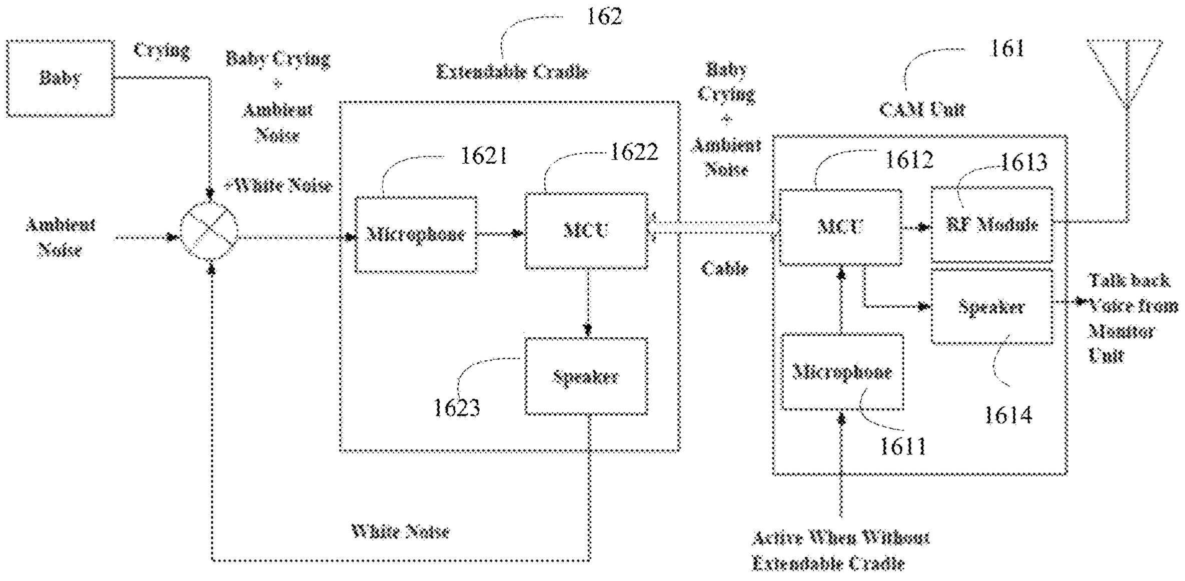
FIG. 16 is a block diagram of the structure of the camera unit with the extendable cradle for filtering the white noises in the third embodiment of the present invention.

Referring to FIG. 16, the first approach is the camera unit 161 has an external device, for example an extendable cradle 162. The extendable cradle is connected to the camera unit via cable or other connection way to generate the soothing sounds for baby and filter the soothing sounds for guardian. The extendable cradle includes a microphone 1621, a MCU 1622, and a speaker 1623. It is not limited to these and can also include other elements according to requirements. The extendable cradle is predefined to store the soothing sounds, for example, there are several different soothing songs.

The microphone of the extendable cradle records the baby sound, ambient noise and white noise. The MCU of the extendable cradle removes the soothing sounds and stationary noise as described above. And then the MCU outputs the recorded sound stream of baby crying and ambient noises to the MCU of the camera unit.

In the first approach, the camera unit 161 includes a microphone 1611, a MCU 1612, a RF module 1613, and a speaker 1614. Since the extendable cradle and the camera unit are all include the microphone, to avoid confusion to the guardian, only the microphone of the extendable cradle is activated whenever the extendable cradle is attached to the camera unit. In other words, the microphone in the camera unit works normally when it is in standalone operation without extendable cradle. The talkback voice can be heard from the speaker of the camera unit no matter it is connected to the extendable cradle or not. To make it more user friendly, the camera unit controls the status of generation of soothing sounds (ON and OFF) through the control pins in the interface between the camera unit and the extendable cradle.

There is a plurality of pins between the interface between the MCU of the extendable cradle and the camera unit. For example, there are total 16 pins and the pin assignment is described as below.

| Pin No. | Pin Name | Function |
|---|---|---|
| 1 | GND | Ground from CAM unit to cradle |
| 2 | CE | Firmware Upgrade |
| 3 | DP | Firmware Upgrade |

-continued

| Pin No. | Pin Name | Function |
|---|---|---|
| 4 | DM | Firmware Upgrade |
| 5 | VCC | Power from CAM unit to cradle |
| 6 | ID | Detection pin for CAM unit to cradle |
| 7 | DAT | I2C communication command pin between CAM unit and cradle |
| 8 | CLK | I2C communication clock between CAM unit and cradle |
| 9 | P3-2 | Data pin between MCU and CAM unit |
| 10 | P3-3 | Data pin between MCU and CAM unit |
| 11 | P3-4 | Data pin between MCU and CAM unit |
| 12 | P3-5 | Data pin between MCU and CAM unit |
| 13 | P3-6 | Data pin between MCU and CAM unit |
| 14 | VCC | Power from CAM unit to cradle |
| 15 | GND | Ground from CAM unit to cradle |
| 16 | GND | Ground from CAM unit to cradle |

In the present invention, ID, DAT and CLK are the control pins between two MCU. Pin2 to Pin4 are reserved for the camera unit's firmware upgrade. Pin 6 is detection pin for extendable cradle. Pin7 and Pin8 are I2C communication pin for data and clock. Pin9 to Pin13 are the sound data pins. However, the number of the pins and the arrangement of the pins are not limited in the present invention.

Figure 17:
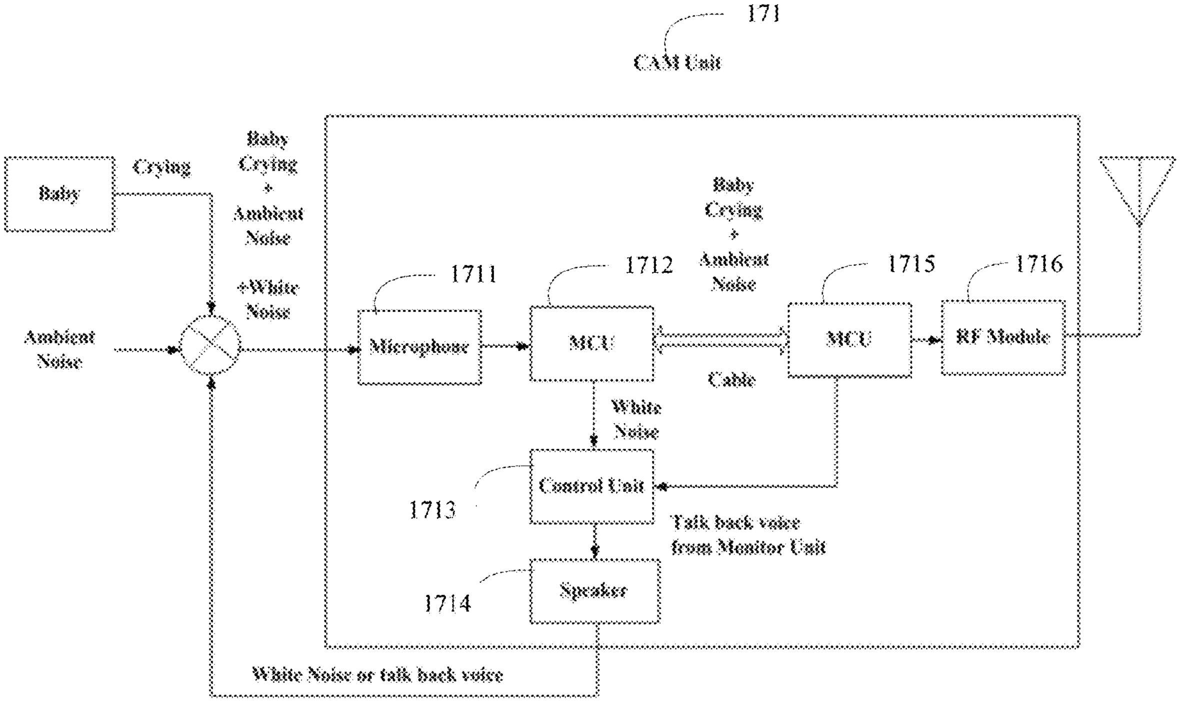
FIG. 17 is a block diagram of the structure of the camera unit as all-in-one hardware implementation for filtering the white noises in the third embodiment of the present invention.

Referring to FIG. 17, the second approach is all-in-one hardware implementation. The camera unit 171 includes a microphone 1711, a first MCU 1712, a control unit 1713, a speaker 1714, a second MCU 1715 and a RF module 1716. The first MCU and the second MCU are connected via cable or other connection way, while the first MCU and the second MCU are all connected to the control unit.

The camera unit is predefined to store the soothing sounds. The microphone records the baby crying, ambient noise and white noise, and the first MCU removes the white noise, i.e. soothing sounds and stationary noise, before sending to the second MCU.

In the embodiment of the present invention, through the extendable cradle attached to the camera unit or all-in-one hardware implementation of the camera unit, the camera unit of the baby monitor can generate the soothing sounds such that baby can have a feeling in nature and safe environment rather than lying down alone in a baby room, so that the emotions of baby can easily calm down and eventually fall asleep. The soothing sounds are also filtered by camera unit before sending to the monitor unit, so that the guardian can keep hearing a crystal clean voice quality at the monitor unit.

It is to be understood that the embodiment of the present invention which has been described is merely illustrative of one application of the principles of the invention. Numerous modifications may be made to the specific structures and functions used in that embodiment without departing from the true spirit and scope of the invention. For example, the present invention can be used for the product category of any kinds of baby monitor with wireless or non-wireless, video or audio type, in any product size etc., to achieve the purpose of noise cancellation, reduction, improvement, enhancement to improve the audio quality performance of the product. The present invention can be used for the product category of any kinds of baby monitor in forms of any system with transmitting video or audio signal from transmitter unit(s) over a wireless network to remote receiver unit(s), e.g., using a transmitter to transmit the video or audio signal to a receiver via 2.4 GHz wireless network. The present invention can be used for the product category of any kinds of baby monitor in forms of user interface to let users to activate the noise cancellation, reduction, improvement, enhancement feature of the product, e.g., using the mechanical button or user interface menu on monitor display etc. The present invention can be used for the product category of any kinds of baby monitor with the use of any design via software or hardware approach (e.g., RC filter circuitry, DSP processor etc.) to realize noise cancellation, reduction, improvement, enhancement feature to improve the audio quality performance of the product. The present invention can be used for the product category of any kinds of baby monitor with the use of any circuitry design (e.g., RC filter circuit) in different circuit component values, no matter the change of any component values in the related circuitry, to cancel, reduce, attenuate the noise signals to improve the audio quality performance of the product. The present invention can be used for the product category of any kinds of baby monitor with the use of any kinds of DSP in the design to achieve the purpose of noise cancellation, reduction, improvement, enhancement feature to improve the audio quality performance of the product.

What is claimed is:

1. A baby monitor system with noise filtering comprises a camera unit and a monitor unit, the camera unit comprises a voice detection module, the monitor unit comprises a Digital Signal Processing (DSP) processor with Environmental Noise Cancellation (ENC) module and filters;

the voice detection module detects target signals from baby and ambient noise signals to form audio streaming data, and transmits the audio streaming data to the monitor unit in encrypted format;

the monitor unit converts the audio streaming data to analog signals and passes the analog signals to input of ENC module of the DSP processor;

the ENC module identifies the noise signals and target signals from the analog signals, and activates the filters to filter the noise signals according to frequency bands of noise for attenuating noise sound and to pass the target signals with signal amplification for improving target sound;

wherein the ambient noise signals include more than one noise and different noises are according to different frequency bands, and the filters are used to filter the noises in identified frequency bands;

wherein the camera unit further includes a single microphone and the monitor unit further includes a microcontroller (MCU); wherein the audio streaming data is transmitted from the output of the single microphone and fed into two audio input ports of the ENC module through the MCU, so that the ENC module receives two audio input signals with the ambient noise signals; when voltage level of a control pin to ENC module is set to ground, the ENC module is activated, and in active state, the ENC module identifies the frequency bands of noise by using auto-correlation function between the two audio input signals and activates the filter to filter the noises in identified frequency bands.

2. The baby monitor system of claim 1, wherein a silence detector in the ENC module classifies the audio input signals as pure environmental noise or environmental noise mixed with baby's sound, while a spectral subtraction process or an attenuation process is performed to the audio input signals.

3. The baby monitor system of claim 1, wherein the DSP processor includes a silence detector for detection of periods of signal inactivity which classify each time frame of data, a noise spectra for updating the periods, a Discrete Fourier transformer (DFT) followed by a magnitude operator for transforming time domain signals to the frequency domain, a lowpass filter (LPF) for reducing noise variance, a post-processor for removing processing distortions introduced by spectral subtraction, an Inverse Discrete Fourier transform (IDFT) for transforming the processed signal to the time domain; and an attenuator for attenuation of the noise during silent periods.

4. The baby monitor system of claim 3, wherein a spectral subtraction based on the DFT is a block processing algorithm, wherein the audio input signals are buffered and divided into overlapping blocks of N samples, each block is Hamming windowed, and then transformed via the DFT to the frequency domain; after spectral subtraction, the magnitude spectrum is combined with the phase of the noisy signal and transformed back to the time domain; each signal block is then overlapped and added to the preceding and succeeding blocks to form the final output; wherein the window and the overlap operations are adopted to alleviate discontinuities at the endpoints of each output block.

* * * * *